Dec. 12, 1933.　　　　S. G. KLEVEN　　　　1,938,840

SCRAPING DEVICE FOR WINDSHIELDS

Filed Feb. 29, 1932

Inventor
S. G. Kleven.
By Whiteley and Rickman
Attorneys.

Patented Dec. 12, 1933

1,938,840

UNITED STATES PATENT OFFICE 1,938,840

SCRAPING DEVICE FOR WINDSHIELDS

Severin G. Kleven, Sisseton, S. Dak.

Application February 29, 1932. Serial No. 595,785

3 Claims. (Cl. 15—250)

My invention relates to scraping devices for windshields, and an object is to provide a device which will subject the surfaces of the windshield over which it moves to the scraping action of a sharp edge. In cold weather frost and ice and sleet are apt to collect on the windshield, and it is desirable to remove the same from a sufficient portion of the windshield to permit the driver to have a clear vision therethrough in order that he may drive with safety. While scraping devices for this purpose have been proposed, so far as I am aware all the prior devices have been so constructed as to either have a position parallel to the operating arm or to have a constant vertical position as they are oscillated over the glass. I have discovered that with such arrangement the scrapers frequently have a vibrating or jumping action with relation to the glass, and, hence, do not thoroughly remove the ice and frost which forms on the glass. In seeking a remedy of such defect of operation, I have found that much better results may be obtained by so arranging the scraping blades that they will have a constant angular relationship to the length of the operating arm, or, differently expressed, a constant inclined relationship across the direction of the path through which the scraper moves. With such arrangement the scraping blades will always cut at an inclination to the progressive movement thereof, and as the result of many experiments I have found that the blades when so disposed will have no jumping action and will, therefore, speedily and completely remove the frost and ice accumulating on the surface of the glass traversed by the blades. Furthermore, in warm weather, when dust and mud accumulate on the windshield, my scraping device will much more effectively remove the same than is possible with wiping devices, and will do this without danger of scratching the glass, which undesirable result is liable to accompany the use of wiping devices.

The full objects and advantages of my invention will appear in connection with the detailed description thereof, and the novel features of my inventive idea will be particularly pointed out in the claims.

In the accompanying drawing, which illustrates a practical application of my invention in one of the forms in which it may be embodied,—

Figure 1:
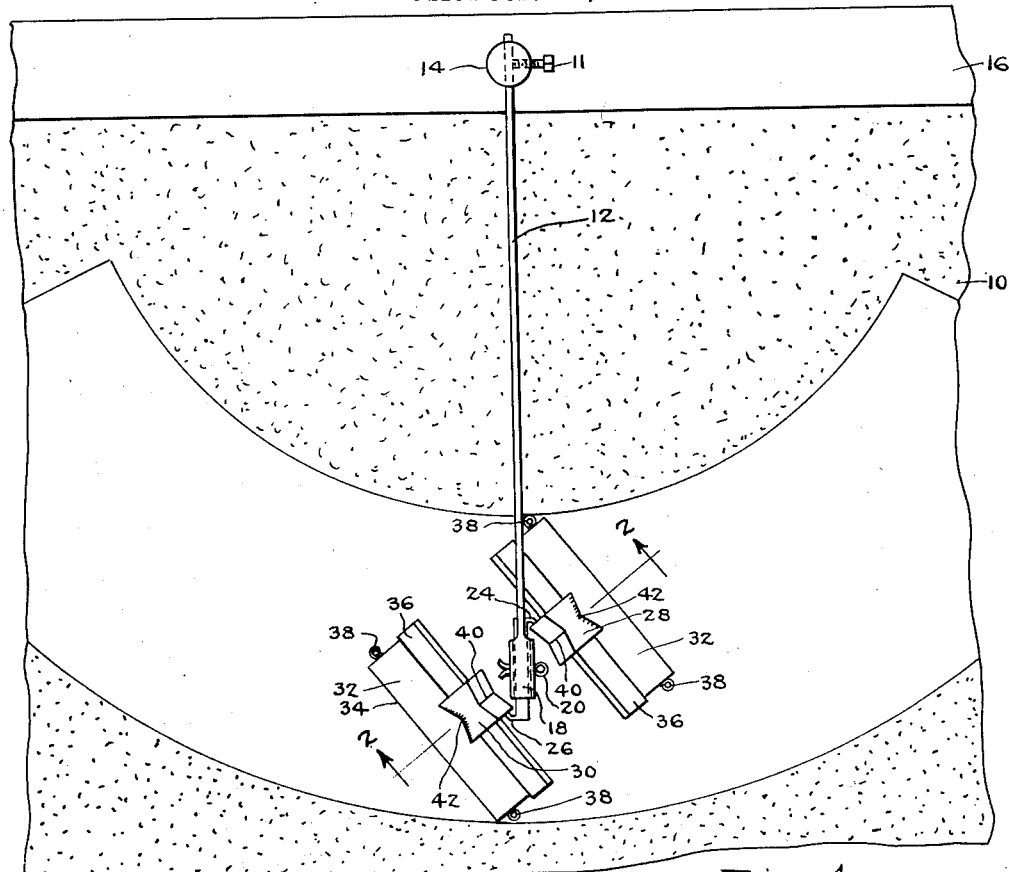
Figure 2:
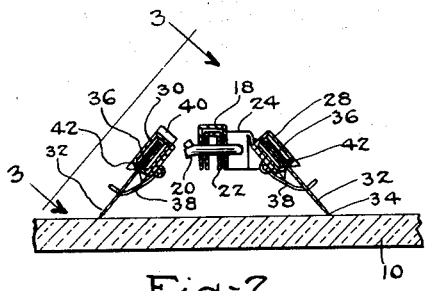
Figure 3:
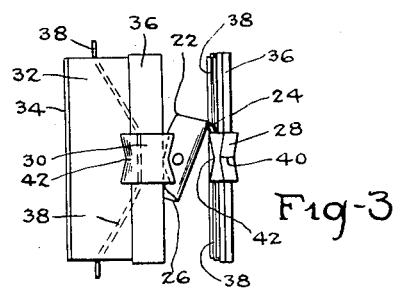
Figure 4:
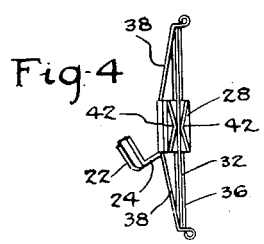
Figure 5:
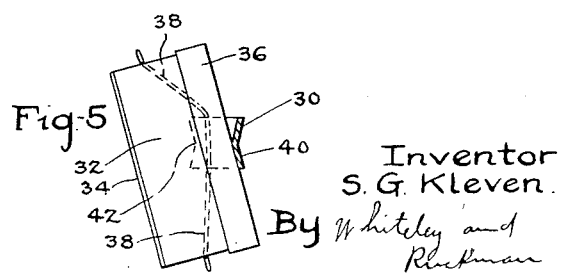

Fig. 1 is a front elevational view showing the device as it appears in operation upon the surface of a windshield. Fig. 2 is a view in section on the line 2—2 of Fig. 1. Fig. 3 is a view taken from the position indicated by the line 3—3 of Fig. 2. Fig. 4 is an elevational view of a portion of the device. Fig. 5 is a side view of the device with a small portion in section.

Referring to the particular construction shown in the drawing for illustrative purposes, the numeral 10 designates a windshield. An operating arm 12 is secured at its upper end by a set screw 11 to a shaft 14 mounted for oscillatory movement in a frame member 16 at the top of the windshield. The shaft 14 may be oscillated in any suitable manner, as by means of a motor commonly used for operating windshield wipers. The lower portion of the arm 12 is made in the form of a channel member 18 having holes in its side members through which a cotter pin 20 is adapted to extend for a purpose which will presently appear. My device includes a support having a body member 22 containing a hole which is adapted to register with the holes in the channel member 18 so that the cotter pin 20 will pass through all of these holes when the member 22 is placed in the channel member 18. From the ends of the body member 22 similar arms 24 and 26 extend out at an angle to the body member. The arms 24 and 26 carry channel members 28 and 30. From Figs. 1 and 2 it will be noted that the channel members 28 and 30 extend outwardly and downwardly from their respective arms 24 and 26 at an angle of 45°, while from Figs. 1 and 3 it will be understood that the channel members 28 and 30 have an angular relation of 45° to the body member 22, and also to the length of the operating arm 12. While these angular relationships have been shown as 45°, it will be understood that this precise angle is not necessary, but is illustrative of the fact that an appreciable angular relationship is required. The channel members 28 and 30 carry scraper blades 32 having sharp outer edges 34 and having inner or back members 36 which are adapted to fit into the space between the side walls of said channel members. These channel members are preferably so constructed that the scraper blades have to be inserted by an endwise sliding movement. In order to hold the scraper blades in the channel members 28 and 30, these members are provided with pairs of spring fingers 38 secured thereto with each pair extending out in opposite directions so that the outer ends of these spring fingers engage the ends of the scraper blades and hold them removable in the channel members. The blades, therefore, may be readily removed and inserted by deflecting one of the spring fingers of each pair thereof. In order to insure that the blades shall engage for their full length with the glass of the windshield, they are capable of rocking movement in channel members 28 and 30. For this purpose the base of each of the channel members may be constructed on an angle, as shown in Fig. 5, having an apex 40 for engagement by the outer edge of the back member 36, and the margins of the side walls of the channel member may be constructed on an angle having apices 42 for engagement with the inner edges of the back member 36.

The operation and advantages of my invention have to a large extent been set forth in the preceding description. The manner in which the scraping blades are caused to always cut at a fixed angle of inclination to the progressive movement of the blades will be understood from Fig. 1. In this figure the speckled portion of the windshield indicates frost or ice or sleet which has accumulated, while the clear space indicates the portion from which the same has been entirely removed by the scraping blades. In order to best accommodate the height of the driver, the device may be adjusted up and down by means of the set screw 11. In practice I have found that two scraping blades of the character shown is amply sufficient to provide all of the clear space that is necessary. On account of the angular positioning of the blades they scrape over a path substantially one-and-one-half times as wide as they would if they were placed opposite each other and parallel to the operating arm 12. It will be understood, however, that additional blades having the angular relationship shown could be provided if found desirable. As previously indicated, the angular positioning of the blades which has been described prevents any jumping or vibrating action thereof with relation to the glass as they move over the surface thereof.

I claim:
1. A scraping device for windshields, comprising an oscillatory arm, a support secured to the outer end of said arm for movement to and fro in a curved path adjacent the windshield, a scraping blade having a sharp edge for engaging the windshield, and means for attaching said blade to said support in such manner that said blade has a constant inclined relationship with respect to the direction of the curved path in which the blade moves.

2. A scraping device for windshields, comprising an oscillatory arm, a support secured to the outer end of said arm for movement to and fro in a curved path adjacent the windshield, a pair of oppositely-disposed scraping blades having sharp edges for engaging the windshield, and means for attaching said blades to said support in such manner that they have an overlapping relationship with respect to each other and a constant inclined relationship with respect to the direction of the curved paths in which they move.

3. A scraping device for windshields, comprising an oscillatory arm, a body member secured to the outer end of said arm, arms extending out in opposite directions from the ends of said body member and having an inclined relationship with respect to the length of said oscillating arm, channel members carried by the outer ends of said arms and whose channels also have an inclined relationship with respect to the length of said oscillatory arm, oppositely-disposed scraping blades having sharp edges for engaging the windshield, and means for securing said blades in said channels whereby the blades have an overlapping relationship with respect to each other, and a constant inclined relationship with respect to the direction of the curved paths in which they move.

SEVERIN G. KLEVEN.